United States Patent
Goh et al.

(10) Patent No.: US 11,495,025 B1
(45) Date of Patent: Nov. 8, 2022

(54) METHOD AND APPARATUS FOR INCREASING SECURITY AT AN ENTRANCE POINT

(71) Applicant: MOTOROLA SOLUTIONS, INC., Chicago, IL (US)

(72) Inventors: Zhe Qian Goh, Simpang Ampat (MY); Shyan Jenq Ho, Bayan Lepas (MY); Bing Qin Lim, Bayan Lepas (MY); Chung Yong Chong, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/452,075

(22) Filed: Oct. 25, 2021

(51) Int. Cl.
| | |
|---|---|
| *G06V 20/52* | (2022.01) |
| *H04N 7/18* | (2006.01) |
| *H04N 5/232* | (2006.01) |
| *G06F 16/903* | (2019.01) |
| *G08B 13/196* | (2006.01) |

(52) U.S. Cl.
CPC ............ *G06V 20/52* (2022.01); *G06F 16/903* (2019.01); *G08B 13/19654* (2013.01); *H04N 5/23299* (2018.08); *H04N 7/18* (2013.01)

(58) Field of Classification Search
None
See application file for complete search history.

(56) References Cited

U.S. PATENT DOCUMENTS

| | | | |
|---|---|---|---|
| 8,451,329 B2 | 5/2013 | Addy | |
| 10,789,665 B2* | 9/2020 | Cornelio | G06Q 90/205 |
| 10,930,140 B1* | 2/2021 | Stone | G08B 29/16 |
| 11,120,121 B1* | 9/2021 | Montenegro | G07F 19/207 |
| 11,176,373 B1* | 11/2021 | Mitura | G06F 16/583 |
| 2006/0271695 A1* | 11/2006 | Lavian | G06F 21/552 |
| | | | 709/229 |
| 2010/0245087 A1* | 9/2010 | Gerner | G07C 9/28 |
| | | | 340/541 |
| 2011/0316700 A1* | 12/2011 | Kasahara | G06T 7/70 |
| | | | 340/541 |
| 2012/0121229 A1* | 5/2012 | Lee | H04N 7/18 |
| | | | 348/E5.085 |
| 2012/0274466 A1* | 11/2012 | Mezger | G08B 13/183 |
| | | | 340/557 |
| 2012/0314063 A1* | 12/2012 | Cirker | G08B 13/19697 |
| | | | 348/143 |
| 2019/0273866 A1* | 9/2019 | Abalos | H04N 5/23229 |
| 2019/0318171 A1* | 10/2019 | Wang | G06V 10/454 |
| 2021/0074097 A1 | 8/2021 | Russo et al. | |
| 2021/0324672 A1* | 10/2021 | Altiner | G07C 9/28 |
| 2022/0027637 A1* | 1/2022 | Madden | G08B 13/1965 |

\* cited by examiner

*Primary Examiner* — Stefan Gadomski

(57) ABSTRACT

A system, method, and apparatus for implementing workflows across multiple differing systems and devices is provided herein. During operation, a security level at an entry point will be increased temporarily when a camera moves its field of view away from the entry point. The security level will return to its original state when the camera moves its field of view back to the entry point.

15 Claims, 4 Drawing Sheets

METHOD AND APPARATUS FOR INCREASING SECURITY AT AN ENTRANCE POINT

BACKGROUND OF THE INVENTION

Many modern security cameras allow for automatic tracking of movement in their field of view. Even cameras without automatic tracking may have pan-tilt-zoom (PTZ) capabilities that let an operator move a camera's field of view in various directions. As beneficial as automatic tracking and PTZ capabilities are in a security camera, these features create a security risk by temporarily moving their field of views away from an original surveilled area (e.g., an entrance to a building). Therefore, a need exists for a method and apparatus for minimizing any security risk at an entrance point when a camera moves its field of view from the entrance point.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
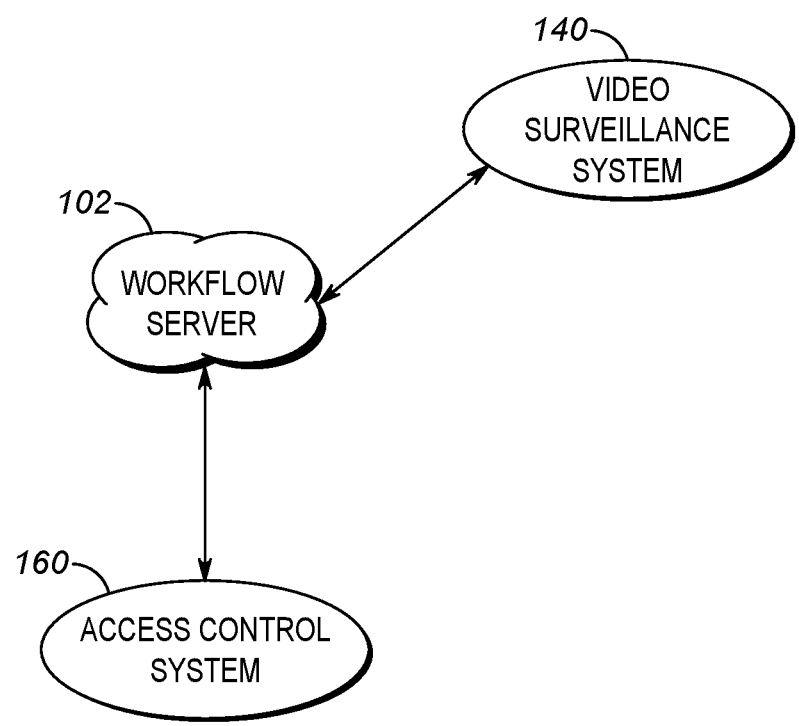
FIG. 1 illustrates a security ecosystem.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for increasing security at an entrance point to a building or facility is provided herein. During operation a security level at an entry point will be increased temporarily when a camera moves its field of view away from the entry point. The security level will return to its original state when the camera moves its field of view back to the entry point.

It should be noted that the term "security level" is a measure of strength of the security measures taken to prevent unwanted entry into a building. The more security measures taken, or the more a security measure accurately identifies an individual, the higher the security level. For example, an entrance with no measures taken to prevent unwanted entry into a building would be considered a lowest security level. An entrance requiring an identification (ID) would be considered a higher security level than taking no measures. An entrance requiring fingerprint scanning would be considered an even higher security level than having an ID requirement, since it is easier to spoof an ID than fingerprints. Having multiple security measures in place for entry (e.g., ID and fingerprint scanning) would be considered an even higher security level, since multiple measures are taken to prevent unwanted entry. A highest security level would be to deny any entry into the building. In short, the higher the security level, the harder it is for an unwanted person to gain entry into a building.

As an example of the above, consider an entry point to a building that requires a badge (ID) to be recognized before granting access to the building. The entry point is also under camera surveillance performing facial recognition that forbids access to various recognized individuals, even if the certain recognized individuals possess a valid badge for entry. Assume that the camera temporarily pans away from the entry point. In response, the security level of the entrance will be temporarily increased until the camera again pans back to the entry point (security level of the entrance will be resumed to original security level when camera pans back to the entry point). For example, the security level may be increased so that no access to the building is permitted while the camera is pointed away from the entry point. Alternatively, another authentication scheme may be temporarily implemented (e.g., finger-print recognition, iris recognition, . . . , etc.) while the camera is pointing away from the entry point.

As another example, consider an entry point to a building that requires no security measures to be taken before granting access to the building. The entry point is also under camera surveillance that records everyone who enters the building. Assume that the camera temporarily pans away from the entry point. At that point, the security level for the entrance will be temporarily increased until the camera again pans back to the entry point. For example, the security level may be increased so that no access to the building is permitted while the camera is pointed away from the entry point. Alternatively, another authentication scheme may be temporarily implemented (e.g., finger-print recognition, iris recognition, or adding multiple authentication methods, said, requiring badge scanning and finger-print recognition, . . . , etc.) while the camera is pointing away from the entry point.

In another example, a surveillance camera in a building is not a dedicated camera for monitoring an entrance point. When the camera pans to another field of view that comprise an entrance point (for example, during an celebration event), the security level of the entrance point will be automatically reduced to allow easier and faster of the access of the entrance during the event (for example, change from need of fingerprint scanning and face scanning to just face scanning only). When the event is over and the camera is pan back to the original field of view, the security level of the entrance point will be increased back to original (in this example, change back to the need of both fingerprint scanning and face scanning).

Turning now to the drawings, wherein like numerals designate like components, FIG. 1 illustrates security ecosystem 100 capable of increasing a security level for an entrance point. As shown, security ecosystem 100 comprises video surveillance system 140, and access control system 160. Workflow server 102 is coupled to each system 140 and 160. It should be noted that although the components in FIG.

1 are shown geographically separated, these components can exist within a same geographic area, such as, but not limited to a building, school, a hospital, an airport, a sporting event, a stadium, . . . , etc. It should also be noted that although only networks and systems 140-160 are shown in FIG. 1, one of the ordinary skill in the art will recognize that many more networks and systems may be included in ecosystem 100.

Workflow server 102 is preferably a server running Motorola Solution's Command Central™ software suite comprising the Orchestrate™ platform. Workflow server 102 is configured to execute workflows stored in memory. Workflows comprise a trigger (i.e., a detected event) and an action. The action is executed whenever the event is detected. Workflow server 102 is configured to receive a particular trigger of when a camera's field of view moves from an entrance and then perform the specific action of instructing access control system 160 to increase the security level of the entrance point.

Video surveillance system 140 is configured to detect various events and report the detected events (triggers) to workflow server 102. Video surveillance system 140 is also configured to receive action commands from workflow server 102 and execute the actions. In one embodiment of the present invention, video surveillance system 140 comprises a plurality of video cameras that may be configured to automatically or manually change their field of views over time or track objects that leave their field of view by moving their field of view. Video surveillance system 140 is configured with a recognition engine/video analysis engine (VAE) that comprises a software engine that analyzes any video captured by the cameras. Using the VAE, the video surveillance system 140 is capable of "watching" video to detect any events and report the detected events (which may be triggers) to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solution's Access Control Management (ACM)™ software suite.

Access control system 160 comprises an Internet of Things (IoT) network. IoT network 160 serves to connect every-day devices to the Internet. Devices such as cars, kitchen appliances, medical devices, sensors, doors, fingerprint sensors, badge scanners, windows, HVAC systems, drones, . . . , etc. can all be connected through the IoT. Basically, anything that can be powered can be connected to the internet to control its functionality. System 160 allows objects to be sensed or controlled remotely across existing network infrastructure. For example, access control system 160 may be configured to provide access control to various doors via a proper badge (sometimes referred to as an ID or key card) being detected. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open or close a door or window, increase a security level for an entrance point as mentioned herein, . . . , etc. For example, the action command may provide instructions to an access control system to require fingerprint scanning prior to granting access to a building.

The above security ecosystem 100 allows an administrator to create rule-based, automated workflows (a workflow comprises a trigger and an action, the action is executed when the trigger is detected) between technologies to enhance efficiency, and improve response times, effectiveness, and overall safety. The above ecosystem 100 has the capabilities to detect triggers (events) across a number of devices within networks and systems 140-160 quickly take actions by automatically executing the proper procedure (i.e., executing the appropriate action once a trigger is detected).

Figure 2:
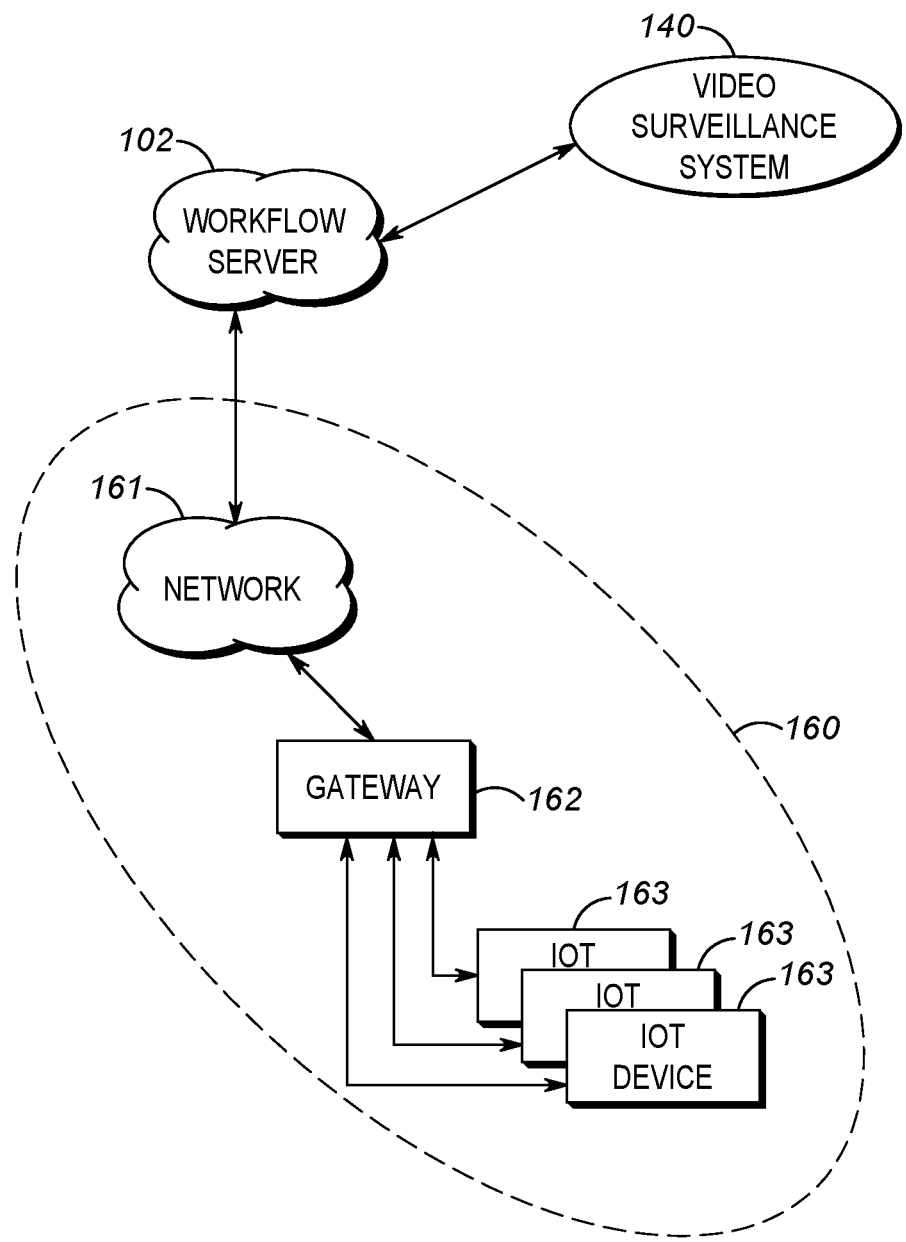
FIG. 2 illustrates a security ecosystem.

FIG. 2 illustrates a security ecosystem capable of determining when a camera's field of view moves away from an entrance point and increasing the security level of the entrance point. In particular, FIG. 2 shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, lights, sensors, fingerprint scanners, iris scanners, ID scanners, facial-recognition systems, . . . , etc. As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTful may also be used.

Gateway 162 preferably comprises an Avigilon™ Control Center running Avigilon's Access Control Management software. Gateway 162 is configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.12, 802.11g) or a WiMAX protocol perhaps operating in accordance with an IEEE 802.16 standard.

Figure 3:
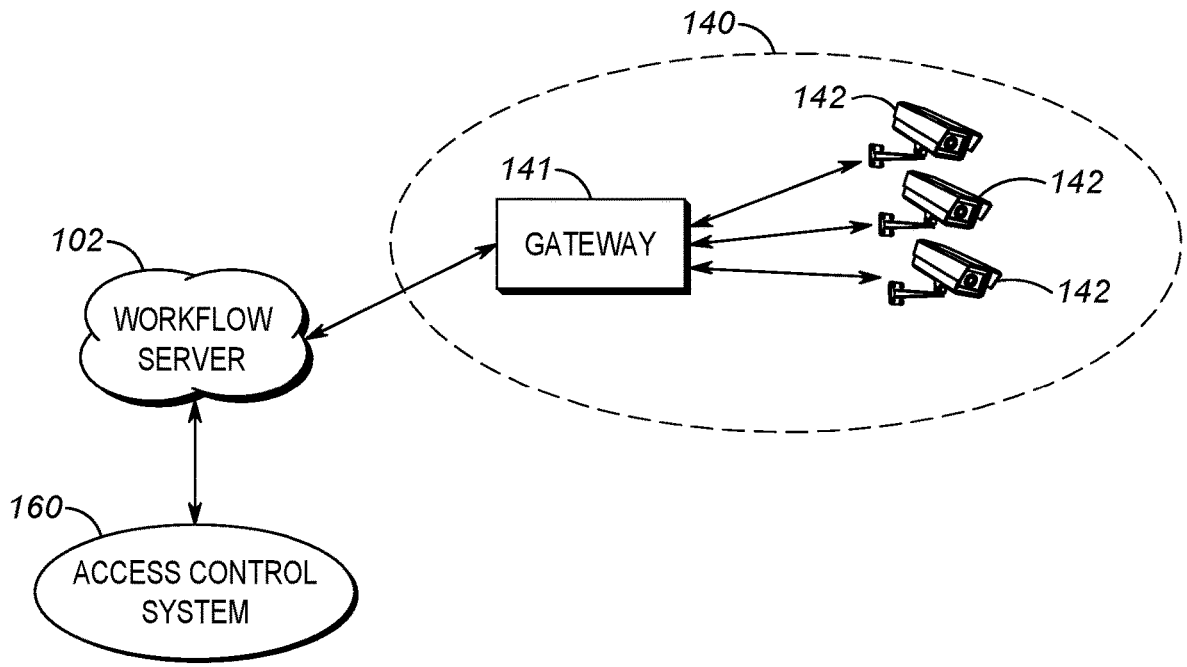
FIG. 3 illustrates a security ecosystem.

FIG. 3 illustrates a security ecosystem capable of determining when a camera's field of view moves away from an entry point and increasing a security level of an entry point. In particular, FIG. 3 shows security ecosystem 100 with an expanded view of video surveillance system 140. As shown, video surveillance system 140 comprises a plurality of cameras 142 and gateway 141.

Cameras 142 may be fixed or mobile, and may have pan/tilt/zoom (PTZ) capabilities to change their field of view, and may be configured to track objects that move from their field of view by panning, tilting, and/or zooming. Cameras 142 may also comprise circuitry configured to serve as a video analysis engine (VAE) which comprises a software engine that analyzes analog and/or digital video. The engine may be configured to "watch" video and detect pre-selected objects or fields of view such as license plates, people, faces, automobiles, fires, a door entrance, . . . , etc.

The software engine may also be configured to detect certain actions of individuals, such as fighting, loitering, crimes being committed, . . . , etc. and track the individuals. The VAE may contain any of several object/action detectors. Each object/action detector "watches" the video for a particular type of object or action. Object and action detectors can be mixed and matched depending upon what is trying to be detected. For example, a facial-recognition object detector may be utilized to detect and recognize individual faces, while a fire detector may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

It should be noted that an entrance to a building may comprise multiple cameras, each assigned a different function and potentially a different VAE. For example, a small camera at a door may provide facial recognition services prior to granting entry, while another camera at the entrance may provide general wide-area surveillance of the entrance.

Figure 4:
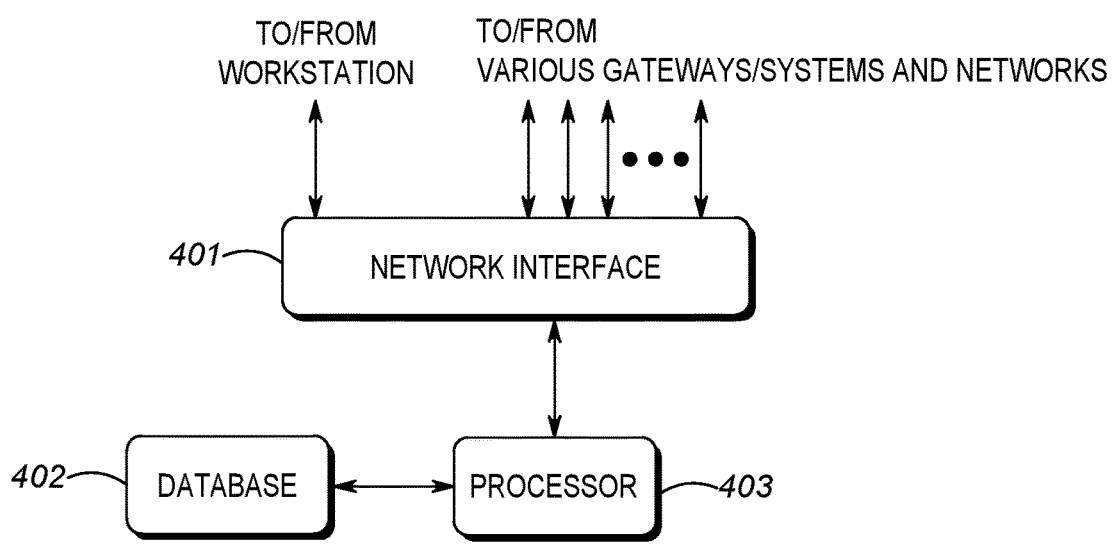
FIG. 4 is a block diagram of a workflow server of FIGS. 1, 2, and 3.

FIG. 4 is a block diagram of a workflow server of FIG. 1. As shown, workflow server 102 comprises network interface 401, database 402, and processor (serving as logic circuitry) 403. Network interface 401 includes elements including processing, modulating, and transceiver elements that are operable in accordance with any one or more standard or proprietary wireless interfaces, wherein some of the functionality of the processing, modulating, and transceiver elements may be performed by means of processor 403 through programmed logic such as software applications or firmware stored on the storage component 402 (e.g., standard random access memory) or through hardware. Examples of network interfaces (wired or wireless) include Ethernet, T1, USB interfaces, IEEE 802.12, IEEE 802.11g, etc.

Logic circuitry 403 comprises a digital signal processor (DSP), general purpose microprocessor, a programmable logic device, or application specific integrated circuit (ASIC) and is configured to receive triggers (e.g., a trigger that a camera has moved its field of view from an entry point) from various gateways, systems, and networks. Once a trigger is received, logic circuitry 403 is configured to execute (or cause to be executed) a particular action for the trigger (e.g., increase a security level for an entry point). More particularly, when logic circuitry 403 receives a trigger from any attached network or system, logic circuitry 403 will access database 402 to determine an action for the particular trigger. Once an action has been determined, logic circuitry will execute the action, or cause the action to be executed. In order to perform the above, logic circuitry executes an instruction set/software (e.g., Motorola Solution's Command Central™ software suite comprising the Orchestrate™ platform) stored in database 402.

Database 402 comprises standard memory (such as RAM, ROM, . . . , etc) and serves to store associations between triggers and actions. As is evident, database 402 comprises a plurality of triggers and a plurality of actions, wherein the plurality of triggers include an indication that a security camera has moved its field of view away from an entrance to a building and an indication that the security camera has moved its field of view back to encompass the entrance to the building, and the plurality of actions include increasing a security level for the entrance to the building from an original security level, and decreasing the security level for the entrance to the building to the original security level. This is illustrated in Table 1, below.

TABLE 1

Associations Between Triggers and Actions.

| Trigger | Action |
| --- | --- |
| Warehouse back door opened | Pan rooftop camera to point at warehouse back door |
| Rooftop camera moved field of view moved away from side door | Increase the security level of side door by adding fingerprint recognition as a criteria for entry through side door along with the original requirements for entry. |
| Rooftop camera moved field of view back to encompass side door | Decrease the security level of side door by removing fingerprint recognition as a criteria for entry in order to revert to the original requirements for entry. |
| Entry-way security camera moved field of view from main door. | Increase the security of main door by requiring a second camera to perform facial recognition in order to gain access to main door. |
| . . . | . . . |

With the above in mind, workflow server 102 comprises an apparatus comprising database 402 comprising a plurality of triggers and a plurality of actions, wherein the plurality of triggers include an indication that a security camera has moved its field of view away from an entrance to a building, the plurality of triggers also including an indication that the security camera has moved its field of view back to encompass the entrance to the building, and the plurality of actions include increasing a security level for the entrance to the building from an original security level, and also include decreasing the security level for the entrance to the building to the original security level.

Workflow server 102 also comprises processor 403 configured to receive a trigger that the camera has moved its field of view away from the entrance to the building, access the database to determine an action for the trigger, the action comprising increasing a security level for the entrance to the building to a heightened security level for the trigger, and increase the security level for the entrance to the building from an original security level to the heightened security level based on the camera moving its field of view away from the entrance to the building.

Processor 403 is also configured to receive a second trigger that the camera has moved its field of view to encompass the entrance to the building, access the database to determine an action for the second trigger, the action for the second trigger comprising returning the security level for the entrance to the building to the original security level, and decrease the security level for the entrance to the building from the heightened security level to the original security level based on the camera moving its field of view to encompass the entrance to the building.

As mentioned above, the security level for the entrance to the building comprises a measure of strength of security measures taken to prevent unwanted entry into a building. Additionally, the original security level may comprise a security level having no measures taken to prevent access to the building and the heightened security level may comprise a security level having security measures that prevent access to the building unless a valid identification is presented, an approved fingerprint is presented, or an approved face is presented.

As mentioned above, security measures comprise such measures as having an approved badge/ID to gain access, having an approved fingerprint to gain access; having an approved face to gain access, or having no approval needed to gain access.

Network interface c401 is provided and configured to send and receive data from a camera and a plurality of IoT devices.

Figure 5:
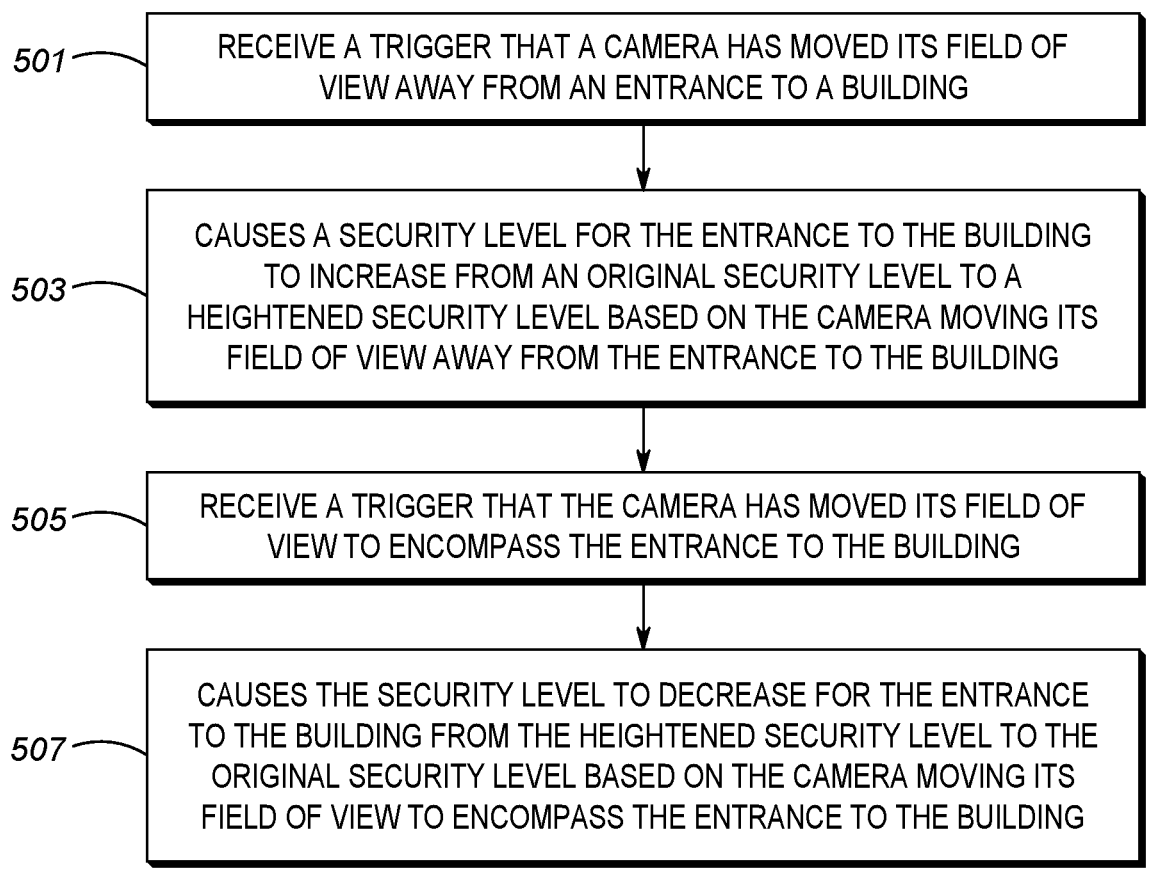
FIG. 5 is a flow chart showing operation of the workflow server of FIG. 4.

FIG. 5 is a flow chart showing operation of workflow server 102. The logic flow begins at step 501 where processor 403 receives a trigger that a camera has moved its field of view away from an entrance to a building. At step 503 processor 403 causes a security level for the entrance to the building to increase from an original security level to a heightened security level based on the camera moving its field of view away from the entrance to the building. At step 505 processor receives a trigger that the camera has moved its field of view to encompass the entrance to the building and then causes the security level to decrease for the entrance to the building from the heightened security level to the original security level based on the camera moving its field of view to encompass the entrance to the building (step 507).

As mentioned, the step of increasing and decreasing the security level comprises the steps of accessing database 402 to determine the heightened and original security level. Additionally, the database comprises a plurality of triggers and a plurality of actions, wherein the plurality of triggers include an indication that the security camera has moved its field of view away from the entrance to the building and an indication that the security camera has moved its field of view back to encompass the entrance to the building, and the plurality of actions include increasing a security level for the entrance to the building from an original security level, and decreasing the security level for the entrance to the building to the original security level.

As discussed, the security level for the entrance to the building comprises a measure of strength of security measures taken to prevent unwanted entry into a building, wherein the original security level may comprise a security level having no measures taken to prevent access to the building and the heightened security level may comprise a security level having security measures that prevent access to the building unless a valid identification is presented, an approved fingerprint is presented, or an approved face is presented.

In the foregoing specification, specific embodiments have been described. However, one of the ordinary skills in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a database comprising a plurality of triggers and a plurality of actions, wherein the plurality of triggers include an indication that a security camera has moved its field of view away from an entrance to a building, the plurality of triggers also including an indication that the security camera has moved its field of view back to encompass the entrance to the building, and the plurality of actions include increasing a security level for the entrance to the building from an original security level, and also include decreasing the security level for the entrance to the building to the original security level;
   a processor configured to:
      receive a trigger that the camera has moved its field of view away from the entrance to the building;
      access the database to determine an action for the trigger, the action comprising increasing a security level for the entrance to the building to a heightened security level for the trigger;
      increase the security level for the entrance to the building from an original security level to the heightened security level based on the camera moving its field of view away from the entrance to the building;
      receive a second trigger that the camera has moved its field of view to encompass the entrance to the building;
      access the database to determine an action for the second trigger, the action for the second trigger comprising returning the security level for the entrance to the building to the original security level; and
      decrease the security level for the entrance to the building from the heightened security level to the original security level based on the camera moving its field of view to encompass the entrance to the building.

2. The apparatus of claim 1 wherein the security level for the entrance to the building comprises a measure of strength of security measures taken to prevent unwanted entry into a building.

3. The apparatus of claim 2 wherein the original security level comprises a security level having no measures taken to prevent access to the building.

4. The apparatus of claim 3 wherein the heightened security level comprises a security level having security measures that prevent access to the building unless a valid identification is presented, an approved fingerprint is presented, or an approved face is presented.

5. The apparatus of claim 2 wherein the heightened security level comprises a security level having security measures that prevent access to the building unless a valid identification is presented, an approved fingerprint is presented, or an approved face is presented.

6. The apparatus of claim 2 wherein security measures comprise having an approved badge/ID to gain access, having an approved fingerprint to gain access; having an approved face to gain access, or having no approval needed to gain access.

7. The apparatus of claim 1 further comprising:
   a network interface configured to send and receive data from a camera and a plurality of IoT devices.

8. A method comprising the steps of:
   receiving a trigger that a camera has moved its field of view away from an entrance to a building;
   increasing a security level for the entrance to the building from an original security level to a heightened security level based on the camera moving its field of view away from the entrance to the building;
   receiving a trigger that the camera has moved its field of view to encompass the entrance to the building; and
   decreasing the security level for the entrance to the building from the heightened security level to the original security level based on the camera moving its field of view to encompass the entrance to the building.

9. The method of claim 8 wherein the steps of increasing and decreasing the security level comprises the steps of accessing a database to determine the heightened and original security level.

10. The method of claim 9 wherein the database comprises a plurality of triggers and a plurality of actions, wherein the plurality of triggers include an indication that the security camera has moved its field of view away from the entrance to the building and an indication that the camera has moved its field of view back to encompass the entrance to the building, and the plurality of actions include increasing a security level for the entrance to the building from an original security level, and decreasing the security level for the entrance to the building to the original security level.

11. The method of claim 10 wherein the security level for the entrance to the building comprises a measure of strength of security measures taken to prevent unwanted entry into a building.

12. The method of claim 8 wherein the original security level comprises a security level having no measures taken to prevent access to the building.

13. The method of claim 12 wherein the heightened security level comprises a security level having security measures that prevent access to the building unless a valid identification is presented, an approved fingerprint is presented, or an approved face is presented.

14. The method of claim 8 wherein the heightened security level comprises a security level having security measures that prevent access to the building unless a valid identification is presented, an approved fingerprint is presented, or an approved face is presented.

15. A method comprising the steps of:
   receiving a trigger that a camera has moved its field of view away from an entrance to a building;
   increasing a security level for the entrance to the building from an original security level to a heightened security level based on the camera moving its field of view away from the entrance to the building;
   receiving a trigger that the camera has moved its field of view to encompass the entrance to the building; and decreasing the security level for the entrance to the building from the heightened security level to the original security level based on the camera moving its field of view to encompass the entrance to the building;
wherein the security level for the entrance to the building comprises a measure of strength of security measures taken to prevent unwanted entry into a building; and
wherein the heightened security level comprises a security level having measures that prevent access to the building unless a valid identification is presented, an approved fingerprint is presented, or an approved face is presented.

\* \* \* \* \*